May 10, 1932.  S. M. FREESE  1,858,148
ARTIFICIAL FLOWERS AND METHOD OF MAKING THEM
Filed Feb. 15, 1930   2 Sheets-Sheet 1
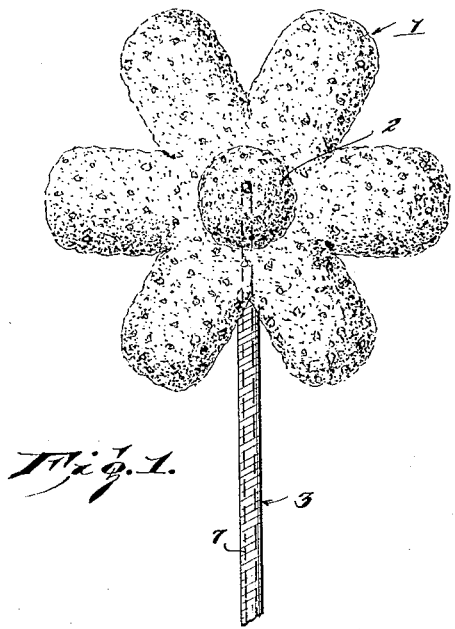
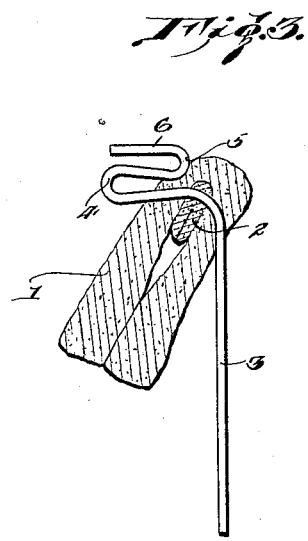
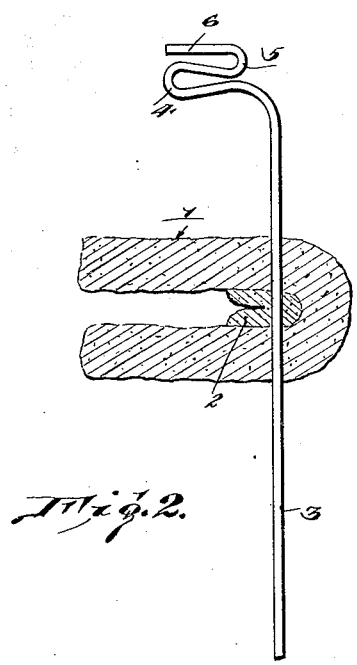
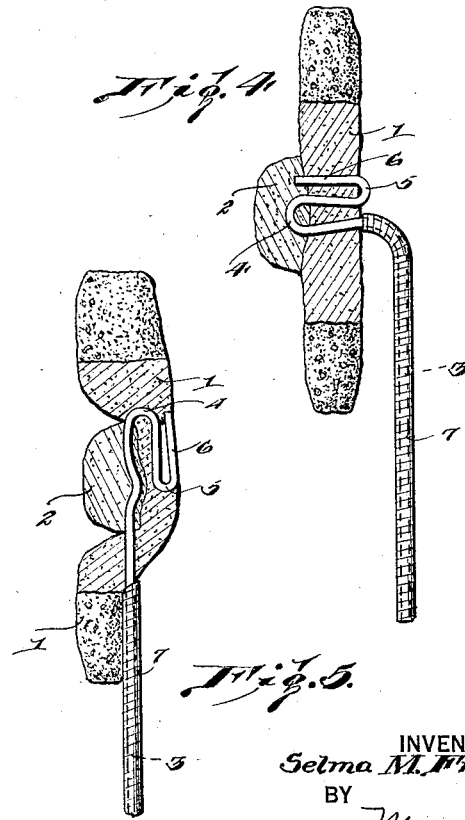
WITNESS
INVENTOR
Selma M. Freese,
BY
ATTORNEY May 10, 1932.   S. M. FREESE   1,858,148
ARTIFICIAL FLOWERS AND METHOD OF MAKING THEM
Filed Feb. 15, 1930   2 Sheets-Sheet 2

WITNESS

INVENTOR
Selma M. Freese,
BY
ATTORNEY

Patented May 10, 1932

1,858,148

UNITED STATES PATENT OFFICE

SELMA MARIE FREESE, OF TEMPERANCE, MICHIGAN

ARTIFICIAL FLOWERS AND METHOD OF MAKING THEM

Application filed February 15, 1930. Serial No. 428,803.

This invention relates to artificial flowers and the method of making them.

It is well known that artificial flowers either for personal use or other decorative purposes are very perishable being deleteriously affected by dust, moisture, and the sun, and more particularly by water.

It is to overcome these objections that this invention is designed and to produce flowers or decorations made in other forms which will be impervious to water being improved rather than injured by washing.

Another object is to provide articles of this character which while having the appearance and attributes of natural flowers will last indefinitely without deteriorating in appearance or otherwise, and which when soiled may be readily rejuvenated by an ordinary bath in soap and water.

Another object of the invention is to so construct flowers and other ornaments of this character that they may be very quickly and easily made without requiring the use of any cement, glue, stitching, vulcanizing, reinforcing or the like and in which a minimum amount of labor and material is required in the making of them.

Another object of the invention is to provide self-locking stems for securing the petals of the flowers together and for connecting the flowers to the stem.

In carrying out these objects, the invention is susceptible of a wide range of modification without departing from the spirit or sacrificing any of the advantages of the claimed invention; there being shown in the drawings for illustrative purposes a preferred and practical form, in which:

Figure 1 represents a front elevation of a flower constructed in accordance with this invention;

Fig. 2 is a transverse section of a flower with the stem shown in the first step of its insertion;

Fig. 3 is a similar view showing the second step in the insertion of the stem;

Fig. 4 is a similar view showing the third and final step with the flower completed;

Fig. 5 is a view similar to Fig. 4 showing a slightly different way of connecting the stem and flower;

Figure 6:
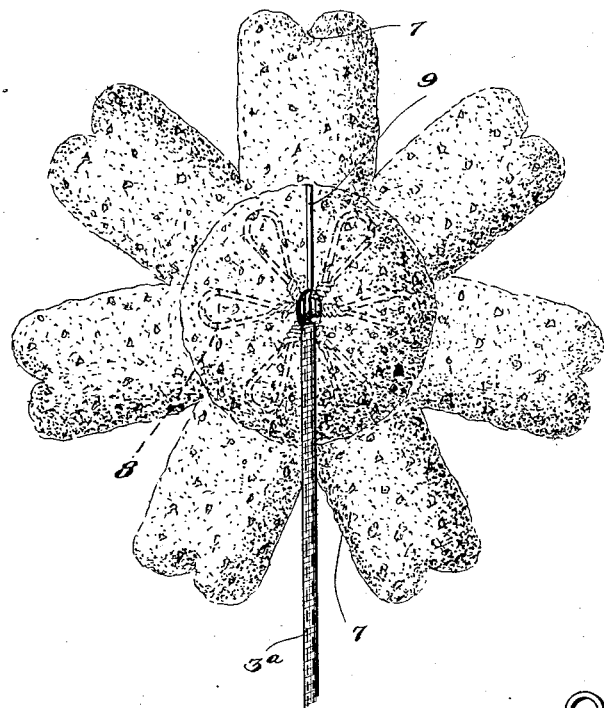
Fig. 6 is a rear elevation showing a slightly different form of the invention.

In the embodiment illustrated in Figs. 1 to 4 a petaled flower 1 is shown cut out of a sheet of rubber sponge, and mounted on a stem 3 and having a center 2 secured by the stem to the flower.

The flowers may be, of course, made in any desired configuration and the decorations need not necessarily be flowers but may be in the form of animals or any other objects. The gist of the invention is that the objects are formed of sheet rubber sponge which may be obtained in many desired shades and in sheets of any desired thickness. These sheets may be laid one on top of the other and a number of the flowers cut out in a single operation. Each flower is secured to its stem 3 which is made of pliable wire, by folding the flower as shown in Fig. 2 and passing the wire 3 through it then drawing the flower up onto the stem where it is engaged and held by the locking loops 4 and 5 and by the insertion of the pointed terminal 6 which when engaged with the rubber prevents any possibility of the flower slipping on the stem. The second step of the forming of the flower is shown in Fig. 3 and the completed form in Fig. 4.

It is to be understood that after the stems have been connected with the flowers these stems are to be wrapped with water-proof tape as shown at 7.

While the flowers shown in Figs. 1 to 5 are composed of two members only, obviously they may be composed of a plurality of petaled sheets each of different size so as to give the formation of a double or single flower at the will of the manufacturer. The petal sheets are laid one on top of the other and with one stroke the flowers are set together by folding the petals and passing the wire stem therethrough; then by pulling the stem through the center of the flower, the petals being of sponge rubber can be brought up into the bend 4 of the stem and this bend acts as a lock for holding the flower in position on the stem and the parts of the flower together. It is of course understood that the petals must be held folded until they are pushed up into the bend or lock of the stem and after they are released they will spring open and lie flat and at the same time catch onto the free end 6 of the wire and be held securely engaged with the stem. It will thus be seen that these flowers require no gluing since they are pinched onto the wire and will not come loose.

Figure 7:
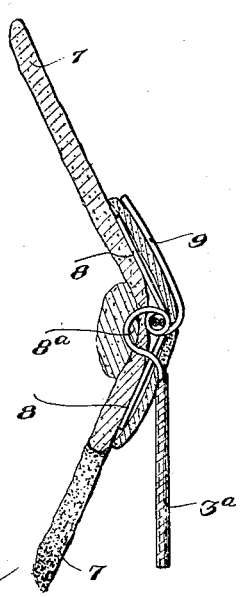
Fig. 7 is a longitudinal section on the line 7—7 of Fig. 6.
Figure 8:
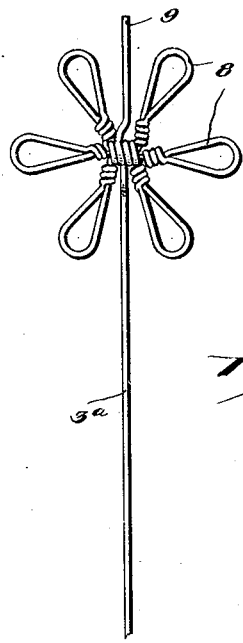
Fig. 8 is a front elevation of the stem detached.

In the form shown in Figs. 6 to 8 the stem 3a is designed for use in connection with larger flowers and to form a proper support for the petals and impart a natural appearance to the flower, the upper end of the stem is twisted to form a plurality of loops 8, six of which are here shown and which are designed to lie flat against the rear face of the petals when the stem is applied as shown clearly in Figs. 6 and 7 with a loop or bend 8a formed at the junction of the loops 8 with the stem as shown in Fig. 7. A finishing sheet or collar 10 is preferably arranged at the back of the petals over the loops 8 and through which the free end 9 of the wire passes and holds the parts securely in position, the bends at the junction of the loops and of the wire also form a lock at this point which is passed through the center of the flower.

From the foregoing description it is obvious that these flowers may be cheaply and practically constructed, the process of forming them embodying the utmost simplicity all that is necessary after the petals have been cut to shape is to lay them one on top of the other, and pull the self locking stem through the center of all of the petals at one time. The petals are folded, as before described, to permit this insertion.

These sponge rubber flowers are especially useful and desirable when they are to be subjected to laundrying such as when used for lingerie or children's clothes since they may be passed through the clothes wringer and even subjected to boiling and when the laundrying of the garment is completed the flowers are found to be not only not injuriously affected by the process but being clean, they look brighter than before laundrying.

Without further description it is thought that the features and advantages of the invention will be readily apparent to those skilled in the art, and it will, of course, be understood that changes in the form, proportion and minor details of construction may be resorted to, without departing from the spirit of the invention or its scope as claimed.

I claim:

1. An artificial flower or the like composed of rubber sponge cut to form whereby a natural appearance together with moisture resisting qualities is imparted to the flower.

2. An artificial flower composed of a piece of rubber sponging cut to form and having means for mounting it on the object to which it is to be applied.

3. An artificial flower composed of rubber sponging having a self locking stem inserted therein.

4. An artificial flower composed of petals cut from rubber sponging and arranged in superposed relation with a self locking stem inserted through said petals and embedded in the material thereof.

5. An artificial flower composed of petals struck out of a sheet of rubber sponging with a wire stem penetrating said petals and having a bend therein to lock the petals to the stem.

6. An artificial flower composed of petals struck out of a sheet of rubber sponging with a wire stem penetrating said petals and having a bend there'n to lock the petals to the stem, one end of said stem being free and adapted to be inserted in the flower.

7. An artificial flower or the like composed of sheet rubber sponging cut out to form with a pliable metal stem having self locking means embedded in the flower to hold the parts assembled.

Mrs. SELMA MARIE FREESE.